April 29, 1969     C. W. HEPPENSTALL     3,440,766

WINDOW UNIT

Filed Feb. 10, 1967

*INVENTOR*
CHARLES W. HEPPENSTALL

BY *Larson and Taylor*

ATTORNEYS

З,440,766
Patented Apr. 29, 1969

3,440,766
WINDOW UNIT
Charles W. Heppenstall, P.O. Box 2325,
Delray Beach, Fla. 33444
Filed Feb. 10, 1967, Ser. No. 615,186
Int. Cl. B60j 1/16
U.S. Cl. 49—372                           1 Claim

ABSTRACT OF THE DISCLOSURE

A window unit including an outer track and an inner track; a window pane slidably mounted in the inner track for opening and closing the window opening; and two panels slidably mounted in the outer track, each panel being movable at least between a first position to cover the window opening outside of the window pane and a second position to one side of the window opening.

Field of the invention

The present invention relates to window units, and in particular it relates to a unitary window unit usable under all weather conditions and including (a) a main window frame such as a glass pane and (b) two additional window panels, for example an insect screen and a hurricane screen alternately slidable to a position covering the window opening outside of the main window frame.

Background of the invention—prior art

To provide comfortable conditions within a room it is usually necessary to mount a second panel outside of the glass pane. However, in most areas, because of changing climatic conditions, it is necessary to use different types of additional panels at different times of the year. For example, in the summer one would employ an insect screen or a sunshade while in the winter one would employ a stronger panel such as a storm window panel or a hurricane panel.

Window units are generally designed to hold only a single "additional" panel. Thus, under normal practice, when the time arrives for changing from one type of outer panel to another, one must follow the inconvenient procedure of removing one type of panel from the window and then inserting another type of panel. Thus, for example, in the spring one would have to remove the hurricane panel and insert the insect screen or sunshade. In the fall one would then have to remove the insect screen or sunshade and replace the same by a hurricane panel.

The present invention seeks to overcome the disadvantages of the presently known arrangement by providing a unitary window unit including, in addition to a glass pane, two outer panels, each mounted for convenient sliding movement from a side storage position to its position in place in front of the glass pane.

Brief summary of the invention

According to the present invention there is provided a convenient window unit including a base having formed therein two parallel tracks, an outer track and an inner track. A main window frame such as a glass pane is slidably mounted in the inner track for movement between a first position to cover the window opening and a second position at the side of, and thereby uncovering the window opening.

The second, or outer track is located immediately behind the inner track and extends laterally to both sides of the window opening to a distance at least equal to the width of the window opening. Two additional panels are slidably mounted in this outer track, one being movable from a position to the right of the window to a position covering the window opening, and the other being movable from a position to the left of the window to the position covering the window opening. Of course only one additional panel may be moved at any given time into the position in front of the window opening.

Thus, assuming that one of the two additional panels provides comfort in the room during warm weather (for example, an insect screen) and the other provides comfort during cold weather (for example, a hurricane panel), then the inconvenient task of substituting one type of additional panel for the other twice a year may be eliminated. Instead, with the present invention it is only necessary to select the desired panel and simply slide the same from its side storage position to its operative position in front of the window opening.

Thus, it is an object of this invention to provide an improved window unit.

It is a further object of this invention to provide a unitary window unit having additional panels conveniently positionable in front of the window pane for comfort conditioning a room all year round.

It is still another object of this invention to provide an improved unitary window unit having a means for mounting a main window frame and a plurality of additional window panels, each of said additional window panels being slidably movable from a storage position to an operative position adjacent the main window frame.

Brief description of the drawings

Other objects and the attendant advantages of the present invention will become apparent from the detailed description to follow together with the accompanying drawings which show a preferred embodiment of the invention. However, it is to be understood that the description and drawings are for purposes of illustration only and that the invention is capable of numerous modifications and variations within the spirit and scope of the invention.

In the drawings.

Description of the preferred embodiment

Figure 1:
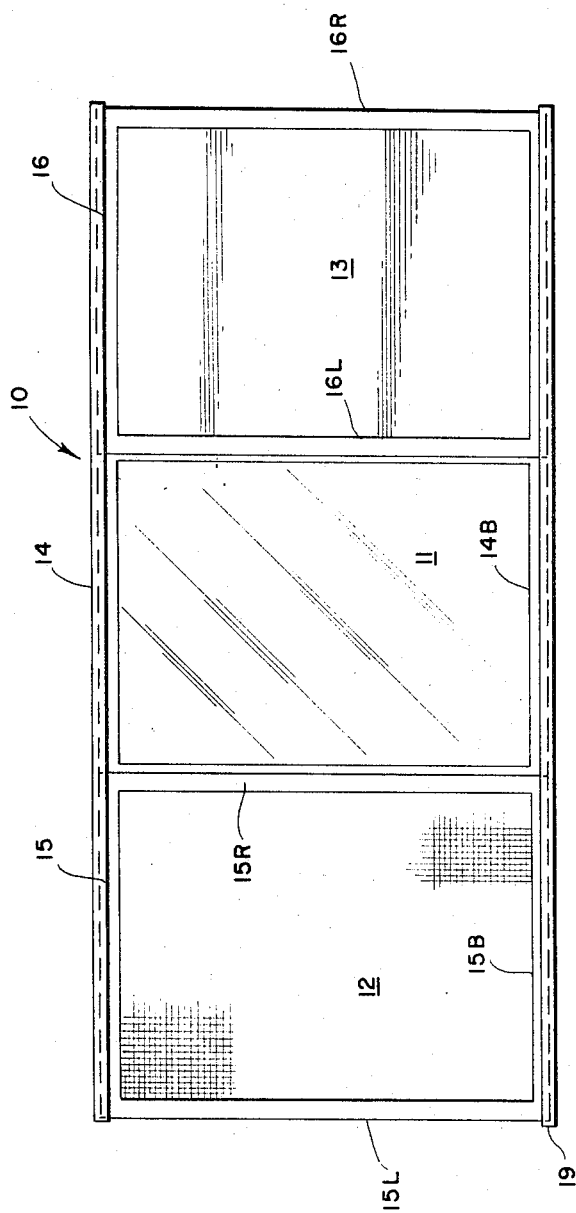
FIG. 1 is a front elevation view of a window unit according to the present invention.

The words "right," "left," "upwardly," "downwardly," etc. as used in this description refer to the position of the window unit as shown in the drawings. It should be apparent that the window unit of the present invention is capable of assuming any position or orientation in use.

Referring to the drawings there is shown a window unit 10 including a main window frame such as a glass pane 11 and two additional panels 12 and 13. One of the panels, for example, panel 12 would be a "summer" panel, for example, an insect screen or a sunshade, while the panel 13 would be a "winter" panel, such as a hurricane frame.

The window pane 11 is bounded by a frame 14 including right and left frame portions 14R and 14L respectively and a bottom frame portion 14B.

Similarly, the two additional panels 12 and 13 are bounded by frames 15 and 16 respectively, each frame having right, left and bottom portions indicated respectively, by the subscripts R, L and B.

Figure 2:
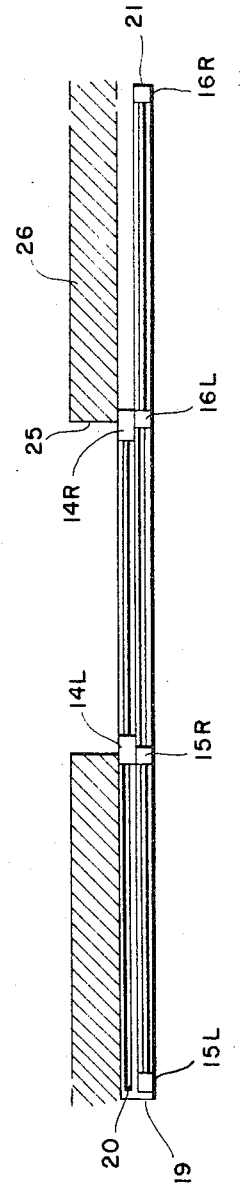
FIG. 2 is a top elevation view of the window unit with a portion removed for purposes of clarity.

Referring in particular to FIG. 2 there is shown a base portion 19 having an inner track 20 and an outer track 21. The main window pane 11 is mounted for sliding movement in track 20, the lower frame portion 14B being slidably mounted therein. The two additional panels 12 and 13 are both slidable in the same track 21, the bottom frame portions 15B and 16B each being slidable therein.

FIG. 2 illustrates the position of the window unit mounted adjacent the window opening 25 of the structure 26. The pane 11 is slidable from the first position, as illustrated in the figure, closing the window opening 25, to a second position to the left of opening 25 to uncover the opening.

Each of the two additional panels are slidable from the side or storage position as shown in FIGS. 1 and 2 to a central position covering the opening 25 outside of the pane 11.

To seal off the outside atmosphere from the interior of the room, the side frame portions 15L and 15R or 16L and 16R of the additional panels may be of a thickness sufficient to contact the side frame members 14R and 14L when the respective additional panel 12 or 13 is moved into place covering the opening 25 in front of the main pane 11. In addition, the side frame portions 16L and 15R may be of reduced thickness, taken in a direction parallel to the tracks, relative to side frame portions 14R and 14L. With this construction the central-most side frame of the additional panel not in use may serve as an abutment to limit movement of the other additional panel into place in front of the pane 11. Thus, referring to FIG. 2, assuming that further rightward movement of panel 13 is prohibited, the side frame portion 16L may serve to limit the rightward movement of panel 12 into position behind the pane 11.

While only the lower tracks 20 and 21 have been described in detail, unit 10 also includes a suitable upper rail member 30 having tracks complementary to the lower tracks 20 and 21; and suitable means for connecting together elements 19 and 30 to form a unitary window unit. Any suitable means may be employed for attaching the window unit of the present invention to the structure 26.

Any suitable materials may be employed for forming the window unit of the present invention. For example, aluminum, plastic, wood, glass, bronze, fiberglass or other suitable materials may be employed. Nylon, or other suitable friction-free material may be employed to form the tracks.

I claim:

1. A window unit including a base, first and second tracks extending in parallel on said base, a main window frame slidably mounted in said first track, said main window frame being movable between a first position in the center of the window unit and a second position to the side of the window unit, a pair of panels mounted in said second track for movement in a plane parallel to the plane of the main window frame, said panels being movable between a storage position to the side of the window unit and a central position behind the main window frame, said window frame and said panel unit each including side frame portions; whereby when the main window frame is in the said first position, its side frame portions sealingly engage the corresponding side frame portion of the panel located in the said central position and wherein movement of one panel from its storage position to the central position is limited by abutment of said one panel with the facing side of the other panel.

References Cited

UNITED STATES PATENTS

| 579,365 | 3/1897 | Pannill | 160—37 X |
| 761,733 | 6/1904 | Wahlstrom | 160—37 |
| 1,325,089 | 12/1919 | Hankammer | 160—37 |
| 1,442,397 | 1/1923 | Gorrani | 49—372 X |
| 2,032,170 | 2/1936 | Fisk. | |
| 2,120,986 | 6/1938 | Morris | 160—37 |
| 2,355,803 | 8/1944 | Hopewell | 160—91 X |

DAVID J. WILLIAMOWSKY, *Primary Examiner.*

PHILIP C. KANNAN, *Assistant Examiner.*

U.S. Cl. X.R.

160—37, 91